Aug. 29, 1950     A. S. PAGE     2,520,778
DUAL AXLE VEHICLE SUSPENSION
Filed Jan. 24, 1949     2 Sheets-Sheet 1

INVENTOR.
ANCEL S PAGE
BY
*T. R. Geisler.*
ATTORNEY

Aug. 29, 1950  A. S. PAGE  2,520,778
DUAL AXLE VEHICLE SUSPENSION
Filed Jan. 24, 1949  2 Sheets-Sheet 2
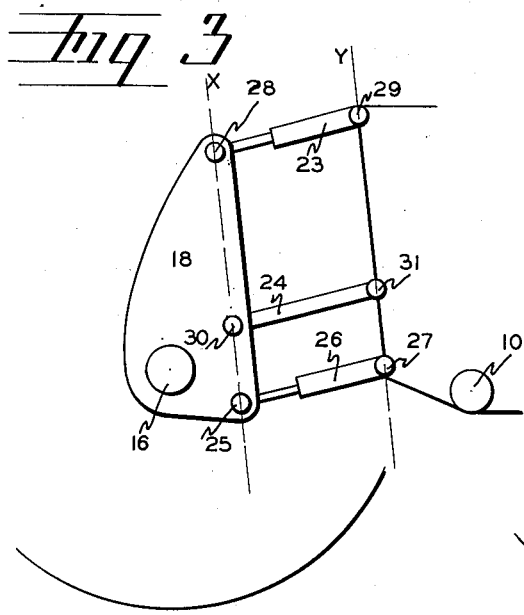
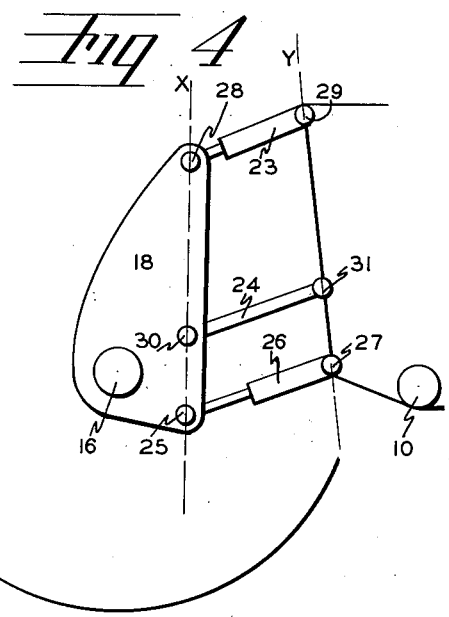
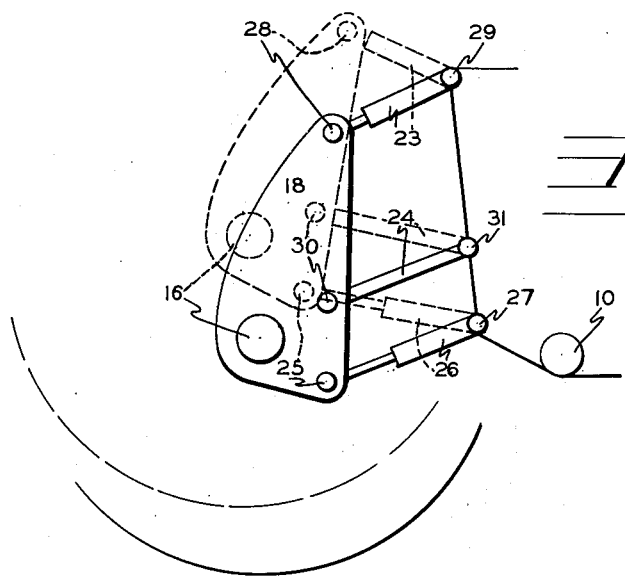
INVENTOR.
ANCEL S PAGE
BY
ATTORNEY Patented Aug. 29, 1950

2,520,778

UNITED STATES PATENT OFFICE 2,520,778

DUAL AXLE VEHICLE SUSPENSION

Ancel S. Page, Portland, Oreg.

Application January 24, 1949, Serial No. 72,337

4 Claims. (Cl. 280—104.5)

This invention relates in general to a vehicle suspension in which dual axles are mounted at opposite ends of longitudinally-extending leaf springs or leaf spring assemblies, and, more specifically, relates to the walking-beam type of dual axle mounting in which such longitudinally-extending leaf springs constitute the main members in the composite walking-beams. Such spring walking-beam assemblies are a common form of vehicle suspension for dual axle trucks and trailers, particularly for dual axle trucks and trailers used in the logging industry.

As is well known, with dual axle spring walking-beams a provision must be made for the absorption of brake torque at the ends of the spring assemblies, and so-called "torque rods" or "radius rods" are customarily connected to the axle housings to provide means for absorbing the brake torque which is imposed on the axles and transmitted to the axle housings.

There is, however, a more complicated problem in which brake torque is a factor, which arises in connection with dual axle spring walking-beam assemblies, and specifically involves the rear wheels and their related axle mounting, when a vehicle with such walking-beam assembly travels down grade on a rough road with the brakes applied to the wheels. This particular problem is a serious one in the operation of dual axle logging trucks and trailers, for example. Considerable attention has been given to the solution of this problem but heretofore, to the best of my knowledge, no satisfactory solution has been worked out. This problem is very apparent to anyone observing the action and operation of a dual axle logging trailer while traveling down a rough, steep logging road, with the usual load of logs supported jointly by the trailer and the leading truck.

When brakes are applied in a vehicle having dual axle walking-beam suspension, there is a greater load thrust on, and a greater braking torque developed, by the front wheels than by the rear wheels. Thus when a dual axle logging trailer is observed while descending a grade it will frequently be observed that the rear wheels will be completely locked by the brakes and will skid on the road surface while the front wheels continue to turn under the application of the brakes. Adjustment of the brakes, in such manner as to cause less braking force to be applied to the rear wheels than to the front wheels, is at best only a partial solution and not a completely satisfactory solution of this difficulty since the factors of load, momentum, and road grade are variable. However, when the road bed is not only steep but rough—a condition characteristic of many logging roads—the problem is a more complicated one. Under such conditions the rear wheels in the dual axle walking-beam suspension, due to the fact that less load is imposed upon them, will bounce up and down to a considerably increased extent when encountering bumps and irregularities in the road bed. This bouncing of the rear wheels, combined with their tendency to become locked by the brakes, increases the skidding hazard and not infrequently the skidding under such combined conditions results in the overturning of the load.

My present invention is directed primarily to reducing this hazard, and, since numerous tests and experiments which I have made prove that this hazard becomes less if the bouncing of the rear wheels when encountering irregularities in the road surface, is reduced, the principal object of this invention is to reduce the skidding of dual axle vehicles under such conditions by restraining the bouncing tendency of the rear wheels.

A related and more specific object of the present invention is to provide an improvement in dual axle spring walking-beam suspension which will in effect act as a shock absorber for the rear axle, under certain conditions, and thereby absorb or reduce the shocks which might otherwise cause excessive bouncing of the rear wheels.

An additional object of the invention is to provide an improved dual axle spring assembly in which effective use will be made of the braking torque developed by the rear wheels in reducing the bouncing, and consequently the skidding of the rear wheels.

A further object of this invention is to provide an improvement in the rear axle mounting for the customary dual axle spring walking-beam assembly which will be simple, practical, relatively inexpensive and capable of increasing the traction of the rear wheels when the brakes are applied.

The manner in which these objects are accomplished by my invention will be described and explained with reference to the accompanying drawings, in which:

Fig. 3 is a fragmentary diagrammatic side elevation indicating the position diagrammatically of the rear axle assembly and associated members under the normal running conditions assumed in Fig. 1;

Figures 1, 2:
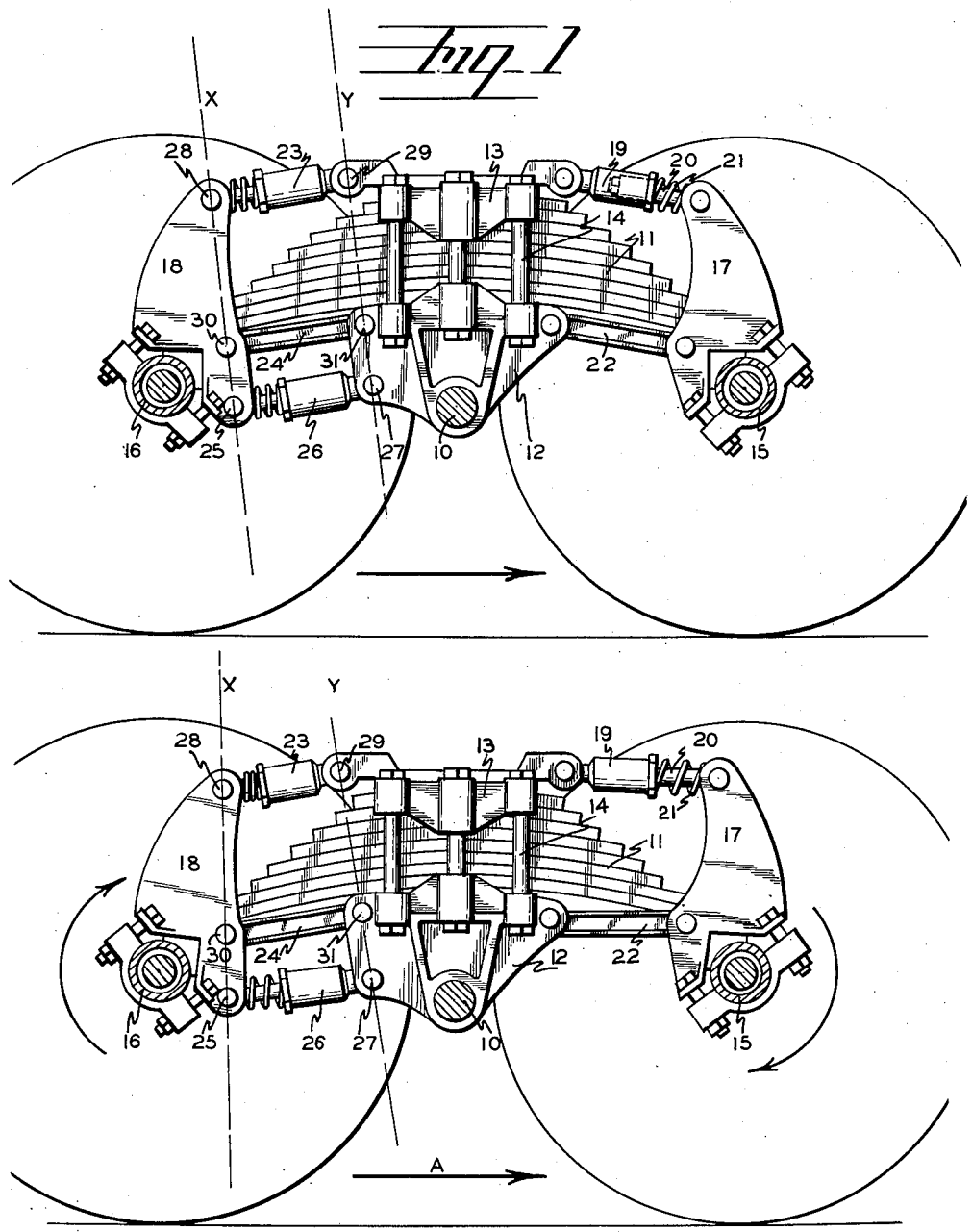
Fig. 1 is a side elevation of a dual axle spring walking-beam assembly embodying my invention, with the rest of the vehicle omitted from the drawing, and illustrating the normal position of the members of such assembly when no braking torque is being exerted.
Fig. 2 is a similar side elevation of the spring walking-beam assembly but illustrating the slightly changed position of certain members due to the application of brakes to the wheels and the resulting development of brake torque.

Fig. 4 is a similar fragmentary diagrammatic side elevation indicating the relative positions of such members when the vehicle is traveling down grade with the brakes applied; and Fig. 5 is a diagrammatic representation indicating in broken lines the effect produced by the lifting of the rear wheels when the wheels encounter bumps in the road surface while the vehicle is traveling down grade with the brakes applied.

Referring first to Fig. 1, 10 is the trunnion shaft on which the main frame (not shown) of the vehicle is pivotally supported. The spring walking-beam assemblies, only one of which is shown, are located at opposite sides of the vehicle as usual and each assembly includes a longitudinally-extending leaf spring 11. Since both spring walking-beam assemblies are identical, it will suffice to describe briefly the one shown in the drawings. The leaf spring 11 is clamped at its central portion on a saddle 12 which is mounted on the trunnion shaft 10, and a top clamping plate 13 is connected to the saddle 12 by suitable clamping bolts 14.

The front and rear axles 15 and 16 respectively are clamped in the axle housings 17 and 18 which are shaped substantially as shown in Fig. 1. The ends of the leaf spring 11 rest in these housings above the axles in the customary manner. The front axle housing 17 is of standard and well known construction and need not be described in detail. It has the usual upwardly-extending portion, the top of which is connected with the central top clamping plate 13 by a resilient link assembly 19, which is also of standard construction and which acts as a composite "torque rod" or "radius rod" to absorb part of the torque transmitted to the axle housing from the axle, which torque is developed by the application of the brake to the front wheels. The link assembly 19 includes a cylinder pivotally connected to the forward end of the clamping plate 13, a plunger rod 20, the forward end of which is pivotally connected to the top of the housing 17 and which is slidably mounted in the cylinder head, a coil spring 21, carried on the rod 20 and held under compression between the cylinder head and the top of the housing 17, and a resilient element, which may be either a second coil spring or a compressible rubber bushing, mounted on the rod 20 between the inside of the cylinder head and a washer and nut on the inner end of the rod 20. Thus this standard link assembly is so constructed that it will be temporarily either shortened or elongated under the application of force, depending upon the direction of the force to which it is subjected, and its pair of resilient elements will offer cushioning resistance in transmitting the thrust or pull from the top of the housing 17 to the top clamping plate 13. A main link 22, the length of which can not be increased or decreased, connects the axle housing 17 with the saddle 12 in the customary manner, its ends being hinged to the axle housing and to the saddle 12, respectively.

This method of mounting the front axle, including the axle housing 17, the top resilient link assembly 19 and the hinged main link 22, is standard construction, and is used to considerable extent, for example, in the dual axle vehicle suspension employed in logging trailers and trucks, as well as other vehicles. My invention is concerned only with the rear axle mounting in this vehicle assembly, which rear axle mounting is now to be described, since, as previously explained, the particular problem with which my invention deals is one which is related particularly to the rear wheels.

The housing 18 for the corresponding end of the rear axle 16 is, to a considerable extent, similar to the front housing 17, and the top of the housing 18 is connected in the same manner to the central clamping plate 13 by a standard resilient link assembly or a composite "torque rod" or "radius rod" 23 of the same construction as the link assembly 19. The housing 18 is also connected to the saddle 12 by a main link 24 corresponding to and similar to the main link 22 for the front axle housing 17. However, the lower portion of the housing 18 extends down further than the front housing 17 in order to provide a pivotal connection at 25 for the rear end of a bottom, and additional, resilient link assembly 26, and the rear bottom portion of the saddle 12 is also modified so as to provide a corresponding connection at 27 for the front end of this bottom additional resilient link assembly 26. This bottom link assembly 26 is similar to the link assemblies 23 and 19 and thus is formed with a pair of resilient elements which permit, but offer resilient and cushioning resistance to, any change in the length of the composite link assembly and thus any change in the length of the resilient linkage between the points 25 and 27.

Thus, as shown in Fig. 1, each rear axle housing 18 is attached to its walking-beam assembly by triple linkage, in place of the customary dual linkage, namely, top resilient link assembly 23, connecting the points 28 and 29, the main non-resilient link 24 connecting the points 30 and 31, and the additional bottom resilient link assembly 26 connecting the points 25 and 27. Preferably I arrange this triple linkage connection in such manner that when no braking force is applied to the wheels, the three links will be substantially parallel, the points 28, 30 and 25 will lie in a line such as the line $x$, the other three points 29, 31 and 27 will lie in another line, such as the line $y$, and these lines $x$ and $y$ will be substantially parallel. This normal running condition of the rear portion of my vehicle suspension is also diagrammatically illustrated in Fig. 3.

When the vehicle is traveling in a forward direction, thus in the direction indicated by the arrow A in Fig. 2, and the brakes are applied to the wheels, the brake torque developed and transmitted from the axles to the axle housings will have a clockwise direction, as viewed in Fig. 2. Thus the brake torque transmitted to the front axle housing 17 will exert a pull on the resilient linkage 19, and, depending upon the amount of the torque, will result in some elongation of the linkage 19 and the consequent compression of one of its resilient elements. Similarly, the torque transmitted from the rear wheel axle 16 to the rear axle housing 18 will cause some slight rotation of the housing 18 in a clockwise direction about the axle 16 as a center. This movement of the rear housing 18, if the torque is great enough, will produce the following more or less obvious results:

1. The line $x$ in which the three points 28, 30, and 35 are located will no longer be parallel to the line $y$.
2. The top link assembly 23 will be reduced in length.
3. The bottom link assembly 26 will be elongated.
4. The point 30 will be lowered slightly. This condition is diagrammatically represented by Fig. 4. It is assumed in Fig. 4 that the rear wheels of the vehicle are momentarily not encountering any bumps or other irregularities on the road surface and that the vehicle is thus traveling on a smooth road down grade with the brakes applied.

When the rear wheels with the brakes applied strike a bump in the road the effect of the wheel contact with such obstruction is not only to cause the rear axle and rear housing 18 to be lifted but also to cause the rear housing 18 to receive an added torque thrust in the same clockwise direction. In Fig. 5 the full line position of the housing 18 and its link connections corresponds to the position illustrated in Fig. 4, but the result of the encounter of the rear wheels with a bump in the road surface will change the position of the housing 18 and its link connections, which changed position is diagrammatically indicated by the broken lines in Fig. 5. Thus it can be observed that the lifting of the rear wheels will lift the housing 18 and will thus cause the point 30 to be raised, and, to a slightly less extent, will raise the points 28 and 25. However, this change of position can not take place without causing some increase in the effective length of the bottom link assembly 26, thus increasing the pulling force exerted by the bottom link assembly 26 on the bottom of the housing 18. This increased pull exerted by the bottom link assembly on the bottom of the housing not only exerts a force to pull the housing downwardly, but I have found that it also has a noticeable effect in holding the wheels to the surface of the ground and acts to counteract the tendency of the wheels to bounce after such encounter with a bump or other irregularity in the road surface. Furthermore this bottom resilient link assembly, due no doubt to the fact that it does tend to keep the wheels pulled down to the ground as long as braking torque is being exerted, has a further value in that it lessens the tendency of the rear wheels to become locked by the brakes. Thus I have found that with equal loads, under equal conditions, a brake force applied to the rear wheels which is just sufficient to cause the rear wheels to lock when the bottom linkage 26 is removed from the walking-beam assembly, will not be sufficient to lock the rear wheels when the bottom linkage 26 is connected up in the manner illustrated, thus proving that my invention does result in increased traction for the rear wheels.

It is possible that a complete explanation of the reasons and underlying theory why my invention produces the increased traction for the rear wheels and reduces the tendency for the rear wheels to bounce, would be more involved and more complicated than this explanation which I have given. However, extensive tests which I have made have demonstrated the fact that my invention, regardless of the underlying theories, does reduce the skidding of the rear wheels in vehicles having walking-beam suspension of the character described.

Obviously the bottom resilient link assembly in my vehicle suspension could be constructed differently from that which I have described, without departing from the principle of my invention. However the particular link assembly which I have illustrated is of standard construction and is thus easily obtainable, and I have found it to be entirely satisfactory in carrying out the novel purpose which it serves in my improved vehicle suspension.

I claim:

1. In a dual axle vehicle suspension of the character described including a pair of walking-beams, means for pivotally mounting said walking-beams, and axle housings at the front and rear ends of said walking-beams, a main link on each walking-beam connecting the rear axle housing to the walking-beam mounting means, an upper link assembly spaced above said main link connecting the top portion of said rear axle housing with said walking-beam mounting means, and a lower link assembly for the rear axle housing, located below said main link and connecting the lower portion of the rear axle housing with said walking-beam mounting means, said lower link assembly being located below the level of said rear axle, said upper link assembly and said lower link assembly being capable of change in length and including resilient means offering resistance to such change in length, and said main link being incapable of change in length.

2. In a dual axle vehicle suspension including a pair of spring walking-beams, a trunnion shaft, a mounting on said trunnion shaft for each of said walking-beams, a top clamping plate at the center of each walking-beam, axle housings at the front and rear ends of said walking-beams, means for holding the front axle housings in position on said walking-beams respectively, a main link on each walking-beam connecting the rear axle housing to the walking-beam mounting, an upper link assembly spaced above said main link connecting the top portion of said rear axle housing with the top clamping plate, and a lower link assembly for the rear axle housing located below said main link and connecting the lower portion of the rear axle housing with said walking-beam mounting, said upper link assembly and said lower link assembly being capable of change in length and including resilient means offering resistance to such change in length, and said main link being incapable of change in length.

3. In a dual axle vehicle suspension of the character described, a pair of walking-beams, a trunnion shaft, a saddle on said trunnion shaft for each of said walking-beams, a top clamping plate at the center of each walking-beam, axle housings at the front and rear ends of said walking-beams, means for holding the front axle housings in position on said walking-beams respectively, a main link on each walking-beam connecting the rear axle housing to the walking-beam saddle, an upper link assembly connecting the top portion of said rear axle housing with the top clamping plate, and a lower link assembly for the rear axle housing, located below said main link and connecting the lower portion of the rear axle housing with said walking-beam saddle, said lower link assembly being located below the level of said rear axle, said upper link assembly and said lower link assembly being capable of change in length and including resilient means offering resistance to such change in length, and said main link being incapable of change in length, whereby when brake torque is transmitted to said rear housing and the rear wheels of the vehicle suspension encounter road bumps, said lower link assembly will be caused to exert an increased downward pull on said rear housing and rear axle.

4. A dual axle vehicle suspension including a pair of walking-beam assemblies, means for pivotally mounting said walking-beam assemblies, axle housings at the front and rear ends of said walking-beam assemblies, means for holding the front axle housings in position on said walking-beam assemblies respectively, a main link connection in each walking-beam assembly for the rear axle housing, composite upper linkage and composite lower linkage connecting each rear axle housing with its walking beam assembly and located above and below the main link connection respectively, said composite upper linkage and said composite lower linkage being capable of change in length when acted upon by a pulling or thrusting force and having resilient means resisting such changes in length, whereby said upper linkage and said lower linkage will operate to cushion the effect of brake torque on said rear axle housings and to cushion any bouncing of the rear wheels while brake torque is exerted on said rear axle housings.

ANCEL S. PAGE.

REFERENCES CITED

The following references are of record in the file of this patent:

UNITED STATES PATENTS

| Number | Name | Date |
|---|---|---|
| 1,743,373 | Moreland | Jan. 14, 1930 |